United States Patent Office 3,289,809
Patented Dec. 6, 1966

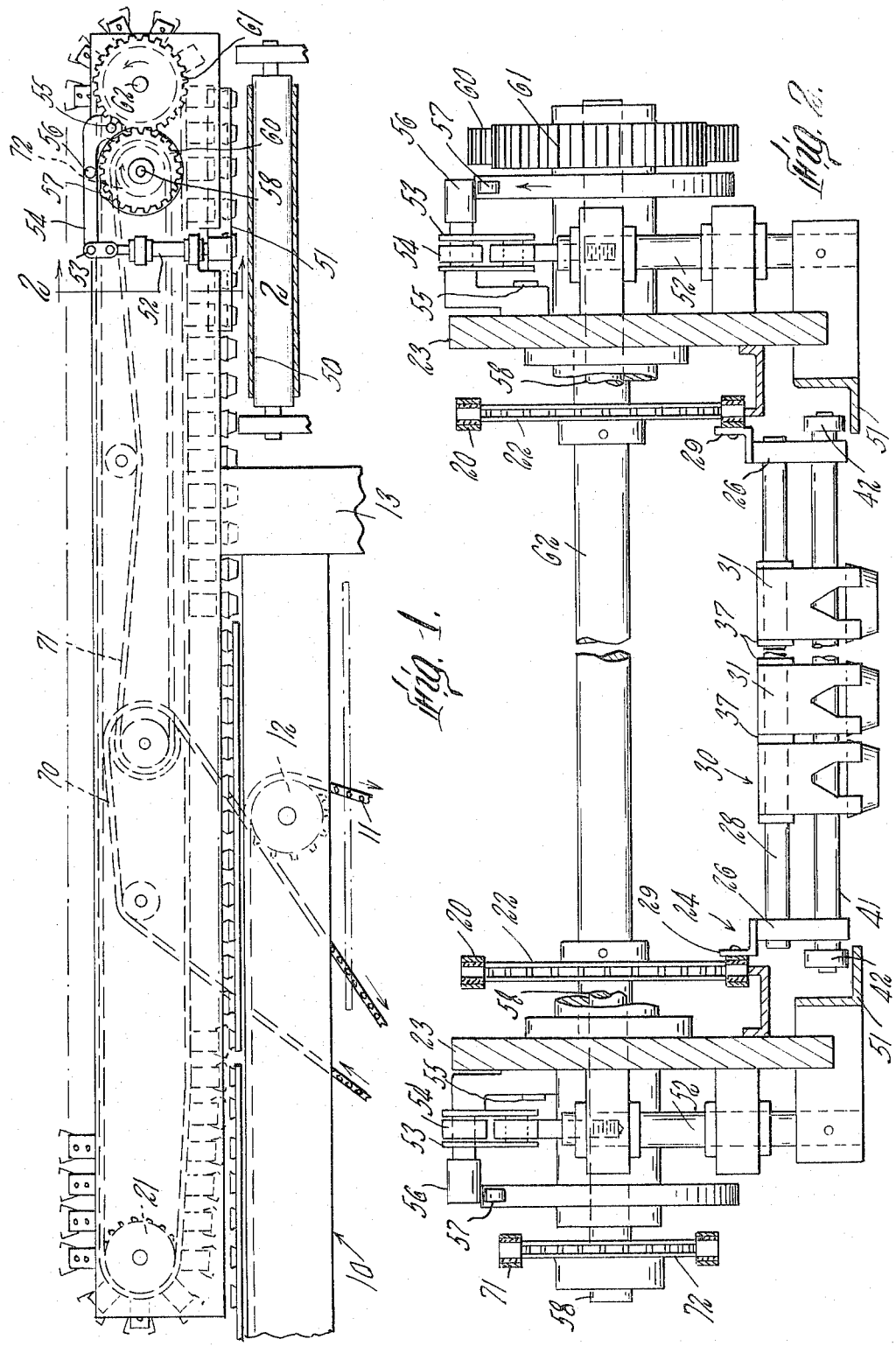

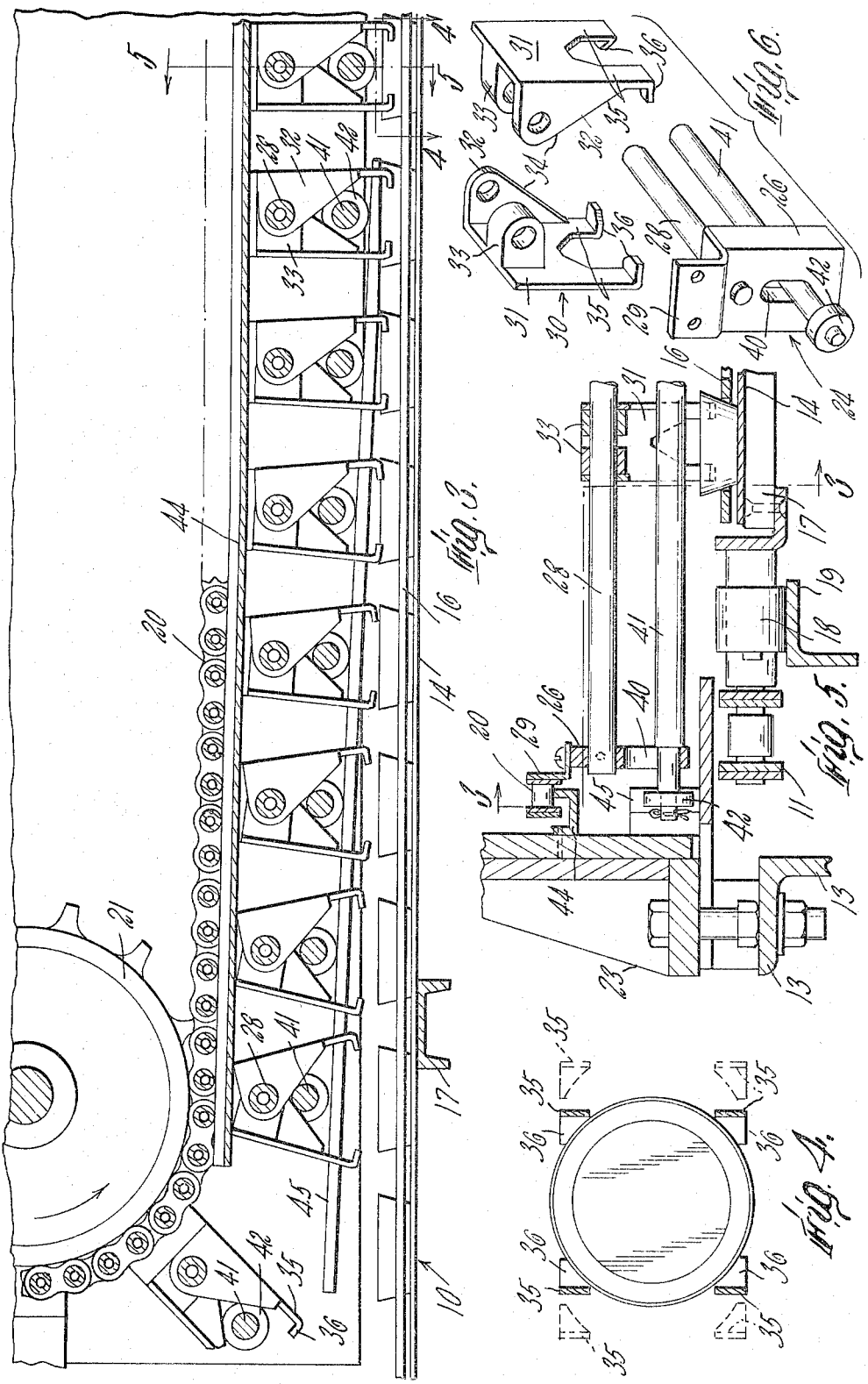

3,289,809
PRODUCT REARRANGING CONVEYOR SYSTEM
William H. Genich, Racine, Wis., assignor to J. W. Greer Company, Wilmington, Mass., a corporation of Massachusetts
Filed Dec. 11, 1964, Ser. No. 417,755
3 Claims. (Cl. 198—34)

This invention relates to conveyor systems and more particularly to an automatic system for rearranging a group of products advancing in uniform rectilinear formation along a conveyor into a different formation, i.e. with a different number of products in each row or with different spacing between the rows, or both.

With present-day automation, products often emerge from one automatic manufacturing operation arranged on a conveyor in a uniform pattern of rows. For example, in the food industry, cups may be filled with chocolate or other food in an automatic multiple-cup filling machine which has a certain capacity. As a succeeding operation, the filled cups may be destined for conveyance through a tunnel cooler and thence to a packaging machine. Oftentimes, the separate pieces of equipment, because of different sources of manufacture, age, or for other reason, do not have matching loading specification, particularly with respect to width. Desirable capital expenditures to reduce production costs, and hence ultimately consumer costs, have often been thwarted by the presence in a multi-stage production line of an irreplaceable, or at least a not fully depreciated, piece of equipment whose input or output product arrangement governs the input or output, as the case may be, arrangement of a preceding or succeeding piece of equipment, or both, without interposing additional manual labor or other complex machinery to change the product arrangement between manufacturing stages. Oftentimes, the added cost of the additional labor or machinery outweighs the savings from upgrading obsolete equipment.

It is hence an object of the invention to provide an automatic product pattern or formation re-arranger of simple construction which is versatile enough to handle a wide variety of situations and therefore has wide enough application to render its manufacture sufficiently economical to justify its installation as a pre-feed-in or post-feed-out unit for other new equipment having product arrangement requirements different from those of production line equipment which is not being replaced. In addition, equipment of this invention can replace any hand labor now used for the purpose.

It is a further object of the invention to provide an automatic machine which can remove products advancing in a certain formation along one conveyor and transport them to and release them onto another conveyor along which they proceed in different formation.

It is a further object of the invention to provide an overhead transport system for an input conveyor for removing products advancing along the input conveyor in a certain formation while maintaining their formation and transporting them for release after they have been carried beyond the end of the input conveyor preferably onto a cross-conveyor along which the released products proceed in different formation because of the different direction of movement.

It is a further object of the invention to provide overhead transport mechanism straddling the output end of an input conveyor and the input end of a cross output conveyor for gripping individual products as they advance along the input conveyor and carrying them over the cross-conveyor and then releasing the products intermittently in groups onto the cross-conveyor.

To achieve the above objectives, apparatus of the invention includes separate input and output conveyors whose surface speeds may be individually controlled and which operate at right angles to one another at substantially the same level with an intervening gap across which the products are transported by an overhead conveyor system. Successive rows of products are transferred to the overhead system as they advance along the input conveyor, preserving their motion direction, rate of speed and pattern of arrangement, and are then intermittently released over and onto a cross output conveyor before they reach the end of the overhead system, the period of time between each release being equal to or a multiple of the time required for the overhead conveyor to advance the distance between two adjacent rows of products. Thus, if the multiple is seven, seven ranks of products will be released at the same time, the speed of the output conveyor being so timed that these seven ranks will be removed beyond the path of the overhead conveyor before the eighth row has advanced to its release position. By varying the speeds of the conveyors and the release timing, any number of rows from one up to the capacity of the width of the output conveyor can appear as an advancing cross-row on the output conveyor.

The objects of the invention and the structure to attain the same will be more fully understood when taken in connection with the following description of a typical embodiment of the invention shown in the drawings wherein:

FIG. 1 is a side elevational view of the apparatus showing the cross-conveyor in section and with only fragments of the input conveyor and the frame of the machine being shown;

FIG. 2 is a cross-sectional view taken along the line 2—2 of FIG. 1;

FIG. 3 is an enlarged detail of a portion of the apparatus shown in FIG 1;

FIG. 4 is a cross-sectional view taken along the line 4—4 of FIG. 3;

FIG. 5 is an enlarged detail taken along the line 5—5 of FIG. 3;

FIG. 6 is an exploded view of certain parts of the apparatus;

Figure 7:
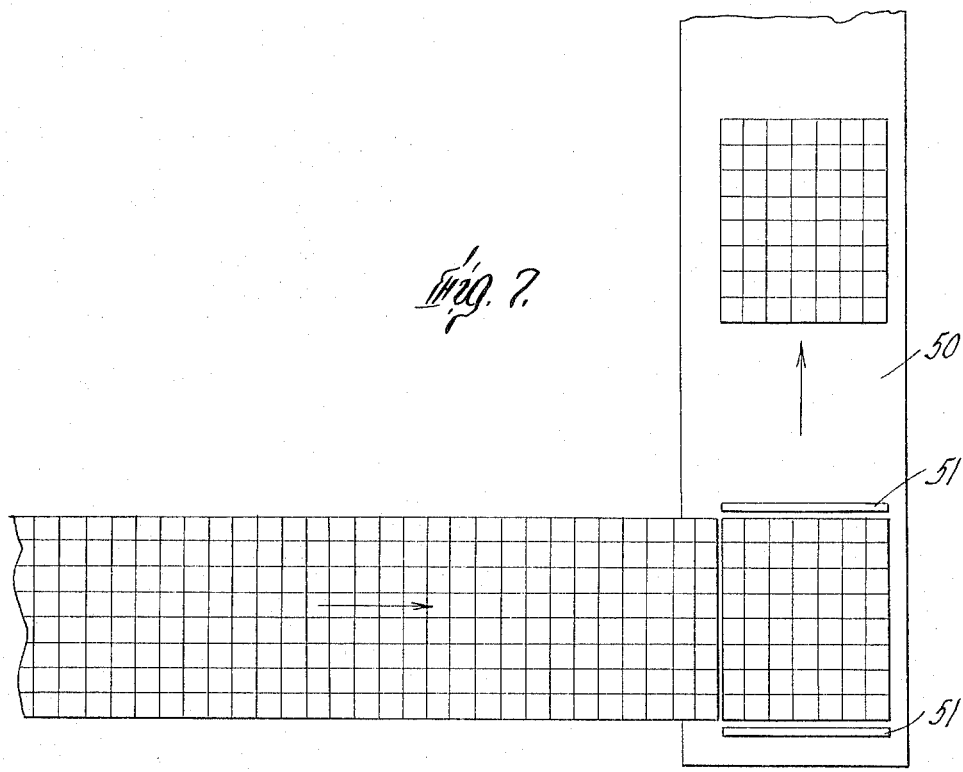
FIG. 7 is a diagram illustrating one type of operation that can be performed on the apparatus; and, FIG. 8 is a diagram illustrating a different type of operation that can be performed on the apparatus.

The drawings illustrate a machine which is designed to handle small paper cups which are filled as with chocolate. An input conveyor 10 of the tray type carries a succession of trays suspended between a pair of endless chains 11 along a substantially horizontal traverse and then withdraws the trays downwardly around the axis of chain-supporting sprocket wheels 12 journalled on the apparatus frame 13. Each tray is a composite of a bottom solid plate 14 (FIGS. 3 and 5) and an upper apertured plate 16, the apertured plate being arranged to receive the filled candy cups in a succession of equally spaced cross rows forming a regular rectilinear pattern of products in both directions. The trays, as shown in FIGS. 3 and 5, in addition to being pivoted between the endless chains 11, have cross supports 17 and levelling wheels 18 which run on parallel spaced tracks 19. Such tray conveyor construction designed to keep the trays level throughout their endless path of motion are well known in the art and need not be further described.

The overhead transport system which constitutes an important element of this invention extends over and beyond the outgoing end of conveyor 10. It includes a pair of spaced parallel endless chains 20 supported over pairs of sprockets 21 and 22 journalled for rotation on the overhead transport system frame 23 which rests for adjustable elevation on frame 13 (FIG. 5).

Suspended between the chains 20 at spaced intervals therealong are a series of gripper carriers 24, each of which includes a pair of end blocks 26 tied together with a tie rod 28. The blocks are restrained against swinging movement relative to the chain links by capping the blocks with angle irons 29 whose vertical ribs are riveted or otherwise attached at at least two points to opposite individual links of chains 20.

Suspended on each rod 28 is a series of evenly spaced grippers 30, each gripper being formed by a pair of identical jaws 31 (FIG. 6) turned face-to-face. Each jaw has a drilled end flange 32 and a drilled boss 33 as shown in FIG. 6 and each end flange has an inclined cam surface 34 so that the inclined surfaces 34 incline in opposite directions when the jaws are assembled face-to-face with the tie rod 28 extending through the aligned holes in the flanges 32 and bosses 33. The jaws are bifurcated at the bottom into two legs 35 which has inturned bottom flanges forming fingers 36 whose inner corner edges are truncated.

The centers of gravity of jaws 31 are such that, when pivotly mounted on tie rods 28, spaced by washers 37, they will normally assume a closed position when they hang downwardly from tie rod 28. However, each end block 26 is vertically slotted at 40 below tie rod 28 to receive and support for vertical movement relative thereto the ends of a cam rod 41 which is provided, outside the blocks 26, with rollers 42.

As endless chains 20 pass around forward sprockets 21, they fall into sliding engagement with a pair of rails 44 which descend very gradually as shown in FIG. 3, into final parallelism with the path of trays 10. Below tracks 44 are inclined cam surfaces 45 which have a still greater inclination, as shown in FIG. 3, and which lie in the paths of the advancing rollers 42 on the ends of cam rods 41.

Accordingly, the gripper shown at the extreme left in FIG. 3 has its cam rod 41 gravitated to the bottom of slots 40, but the next gripper has its rollers 42 engaging cam surfaces 45 at such a vertical distance from the superimposed tie rod 28 that its jaws have been spread. By comparing the vertical distances between the axes of the vertically aligned rods 28 and 41 in the succession of grippers shown in FIG. 3, it will be seen that the cam rods 41 slowly drop as a row of grippers travels past the cam surfaces 45, to permit the jaws of every gripper in that row to close by gravity moving the fingers from their relative dotted line positions, as shown in FIG. 4, to the full line position shown in FIG. 4 and engaging each round tapered cup below its rim before the row of grippers passes beyond the end of the tray conveyor 10.

As shown in FIG. 1, the overhead transport system extends beyond the end of input conveyor 10 and passes over the path of a cross-conveyor 50. During this travel, the cam rollers 42 on each side of the grippers, after they have passed off the cam surfaces 45 eventually pass over lift plates 51 which, in the example shown (FIG. 1) have a length embracing seven cross rows of grippers. The plates 51 are fixedly connected to vertically reciprocal rods 52 linked at their tops by links 53 to levers 54 pivoted on the overhead frame 23 at 55. The levers carry cam followers 56 which engage cams 57 fast on cross shaft 58. Shaft 58 carries on its end a gear 60 meshing with a gear 61 fast on shaft 62 which carries the rear sprocket wheels 22. Rods 52, as shown, are of two-piece screw-threaded construction to afford ready vertical adjustment of the dwell position of lift plates 51 relative to the paths of rollers 42.

In the embodiment shown, the gear ratio of gears 60 and 61 is such as to cause plates 51, acting as periodic release means, to be raised once for every seven rows of gripper advance. If then there are eight grippers in each row and all the tray holes are filled, fifty-six cups will be dropped onto conveyor 50 simultaneously, as indicated in FIG. 7 where each square represents a cup. It will be understood that the lift plates 51 are lifted only momentarily for a period of time less than that required to advance a cross row the distance between the rows, so that the plates resume their dwell position before the cam rollers 42 controlling the next unreleased row of products reach the plates 51.

By changing gears 60 and 61 and changing the length of plates 51, the plates can be actuated faster to drop any number of desired rows simultaneously up to the width capacity of conveyor 50.

Figure 8:
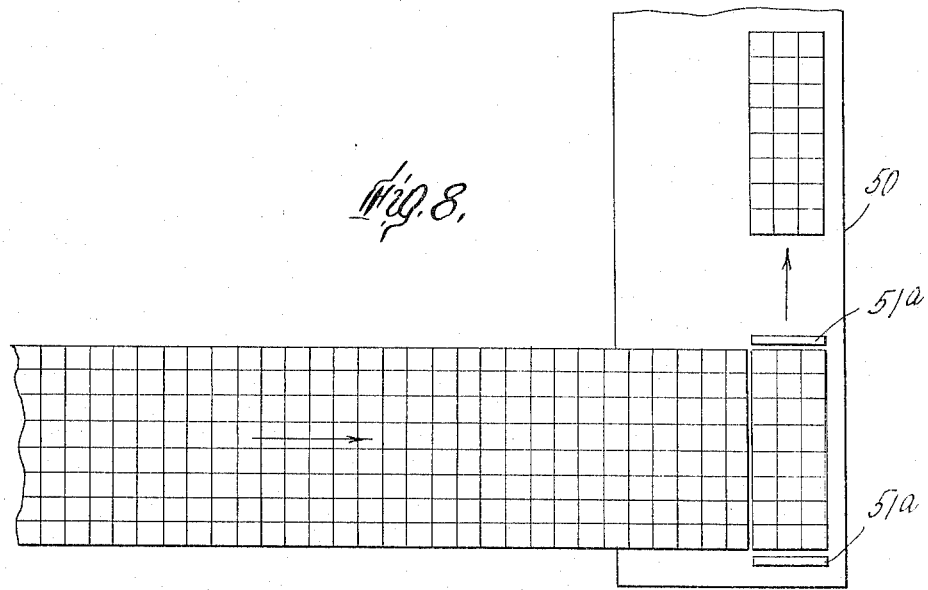

Thus, in FIG. 8, the plates 51a are of such shorter length and the timing has been so arranged as to transfer eight abreast advancing cups on conveyor 10 into three abreast advancing cups on conveyor 50, thus releasing twenty-four cups with each actuation of lift plates 51a.

Also FIGS. 7 and 8 indicate that the speed of conveyor 50 may be such as to leave gaps between the groups of simultaneously released products or, if desired, the speed of conveyor 50 may be adjusted so that there are no gaps between the groups.

The necessary drives may be synchronized in any desirable fashion. In the apparatus shown, two variable speed motors are used, one to drive input conveyor 10 and the lift plates 51 and overhead transport system, including coupled chain drives 70, 71 passing over a sprocket 72 on shaft 58, and one to drive output conveyor 50.

What is claimed is:

1. Apparatus for removing products advancing in rectilinear formation along an endless conveyor comprising a frame supporting said conveyor, an endless series of opposed gripping jaws mounted for movement along an endless path extending downwardly over, into parallelism with and beyond the end of said conveyor, said opposed jaws during their advance in parallelism with said conveyor being arranged in the same rectilinear formation as said advancing products, said jaws being normally closed, and cooperating cam means for initially opening and then permitting the gradual closing of said jaws as they move along said endless path, and means for simultaneously opening the jaws of a succession of grippers in said series after they have moved beyond the end of said conveyor.

2. In an overhead transport system, a frame, a series of grippers mounted in cross rows on said frame for movement through an endless path including a lower substantially horizontal traverse, each gripper having a pair of opposed movable jaws, cam surfaces on both jaws of each gripper, a common cam rod mounted for movement towards and away from the cam surfaces of all the grippers in each cross row, a cam surface on said frame for moving each cam rod simultaneously into engagement with all the said cam surfaces of grippers in a single row, as said grippers descend into said lower traverse, to open the jaws of grippers in each row successively, and then gradually out of engagement with said gripper jaw cam surfaces, as each cam rod proceeds along said lower traverse with said gripper jaw cam surfaces, to permit the jaws of grippers in each row successively to close by gravity and means on said frame adjacent the outgoing end of said lower traverse to move a succession of said cam rods simultaneously into engagement with said jaw cam surfaces to open the jaws of groups of grippers in a plurality of rows simultaneously.

3. An overhead transport system as claimed in claim 2 wherein said cam rods move vertically towards said jaw cam surfaces to open said jaws, wherein the means to open the jaws includes a pair of lift plates mounted below the path of said cam rods and a cam for periodically lifting said plates to raise a succession of said cam rods simultaneously.

References Cited by the Examiner

UNITED STATES PATENTS 2,213,774   9/1940   Taylor.
2,783,869   3/1957   Thurman _____ 198—179

EVON C. BLUNK, *Primary Examiner.*

EDWARD A. SROKA, *Examiner.*